US008190568B2

(12) United States Patent
Caballero-McCann et al.

(10) Patent No.: US 8,190,568 B2
(45) Date of Patent: May 29, 2012

(54) SYSTEM AND METHOD FOR PROVIDING INTERACTIVE COMMUNICATIONS

(75) Inventors: Denise G. Caballero-McCann, Raleigh, NC (US); Stephen Levy, Cary, NC (US); John A. Toebes, Cary, NC (US); Labhesh Patel, Mountain View, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 11/133,915

(22) Filed: May 20, 2005

(65) Prior Publication Data

US 2006/0265347 A1 Nov. 23, 2006

(51) Int. Cl.
G06F 7/00 (2006.01)
G06F 17/00 (2006.01)
(52) U.S. Cl. .......................... 707/617; 707/621; 707/634
(58) Field of Classification Search .......................... None
See application file for complete search history.

(56) References Cited

U.S. PATENT DOCUMENTS

| | | | | |
|---|---|---|---|---|
| 5,742,906 A | 4/1998 | Foladare et al. | ............ | 455/461 |
| 5,946,619 A | 8/1999 | Kolev | ............ | 455/432 |
| 6,332,082 B1 | 12/2001 | Fuller et al. | ............ | 455/461 |
| 6,542,751 B1 | 4/2003 | Blink et al. | ............ | 455/458 |
| 6,700,967 B2 | 3/2004 | Kleinöder et al. | ......... | 379/201.1 |
| 6,754,484 B1 | 6/2004 | Hiltunen et al. | ............ | 455/412.1 |
| 6,807,423 B1 | 10/2004 | Armstrong et al. | ............ | 455/440 |
| 7,072,941 B2 * | 7/2006 | Griffin et al. | ................ | 709/204 |
| 2003/0041048 A1 * | 2/2003 | Balasuriya | ....................... | 707/1 |
| 2003/0120805 A1 * | 6/2003 | Couts et al. | .................... | 709/238 |
| 2004/0003042 A1 * | 1/2004 | Horvitz et al. | ................ | 709/204 |
| 2004/0006551 A1 * | 1/2004 | Sahinoja et al. | .................. | 707/1 |
| 2004/0114744 A1 | 6/2004 | Trossen | | |
| 2004/0162881 A1 | 8/2004 | Digate et al. | | |
| 2004/0225679 A1 | 11/2004 | Oran | ........................ | 707/104.1 |
| 2005/0076338 A1 * | 4/2005 | Malik | ........................ | 718/100 |
| 2006/0036642 A1 * | 2/2006 | Horvitz et al. | ................ | 707/102 |
| 2006/0068818 A1 * | 3/2006 | Leitersdorf et al. | .......... | 455/466 |
| 2006/0253593 A1 * | 11/2006 | Jachner | ........................ | 709/227 |
| 2008/0256107 A1 * | 10/2008 | Banga et al. | .................. | 707/102 |

FOREIGN PATENT DOCUMENTS

CN 1543615 A 11/2004
(Continued)

OTHER PUBLICATIONS

Mpathix, Inc., "Products & Services: Presence and Availability Management," http://mpathix.com/products/presence_availability.shtml, 2 pages, Apr. 13, 2005.

(Continued)

*Primary Examiner* — Rehana Perveen
*Assistant Examiner* — Raheem Hoffler
(74) *Attorney, Agent, or Firm* — Baker Botts L.L.P.

(57) ABSTRACT

A system and method for providing interactive communications includes receiving a communication from an originator destined for a persona. An identity of the persona is determined and one or more rules associated with the identity of the persona is determined. Presence information of the persona is obtained. The communication is sent to the persona in accordance with the determination of the identity of the persona, the one or more rules associated with the identity, and the presence information of the persona.

23 Claims, 2 Drawing Sheets

FOREIGN PATENT DOCUMENTS

WO    WO 03/017139 A1    2/2003

OTHER PUBLICATIONS

SingTel Paging, "Internet Personal Secretary," http://w3.singtel-page.com.sg/ppa/ppa-fea.html, 3 pages, Feb. 21, 2005.

"Universal Mobile Telecommunications System (UMTS)"; Presence Service; Architecture and functional description; Stage 2 (3GPP TS 23.141) ETSI Standards, European Telecommunications Standards Institute, vol. 3-SA2, No. V670, Sep. 2004, XP014027506 ISSN: 0000-0001, Chapters 5, 6.

"Universal Mobile Telecommunications System (UMTS)"; Service requirements for 3GPP Generic User Profile (GUP); Stage 1, (3GPP TS 22.240 version 6.5.0 Release 6), ETSI Standards Institute; vol. 3-SA1, No. V650, Jan. 2005, XP014027435; Chapters 4-6.

Zarri, "Future Service Capabilities Offered by the 3GPP System", IEEE, Jun. 2003, XP002395476.

First Office Action in Chinese Application No. 200680010478.6 (with translation), dated Jul. 6, 2010, 11 pages.

The Second Office Action in Chinese Application No. 200680010478.6 dated May 20, 2011, 14 pages (with translation).

* cited by examiner

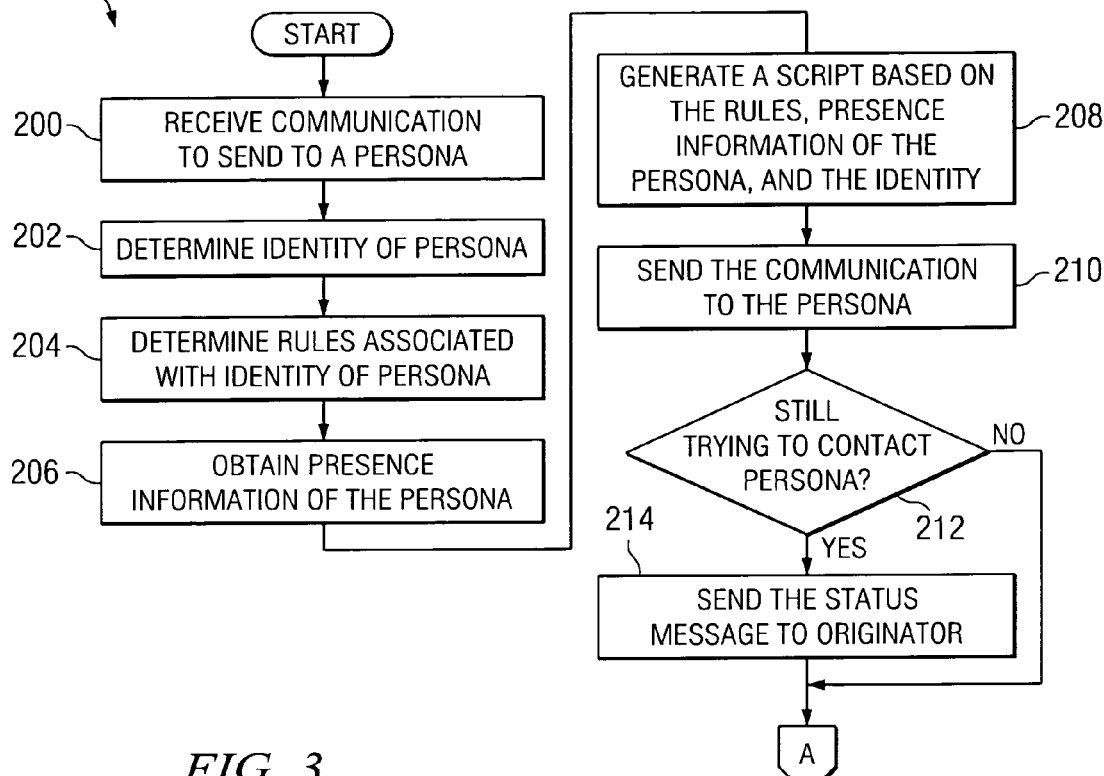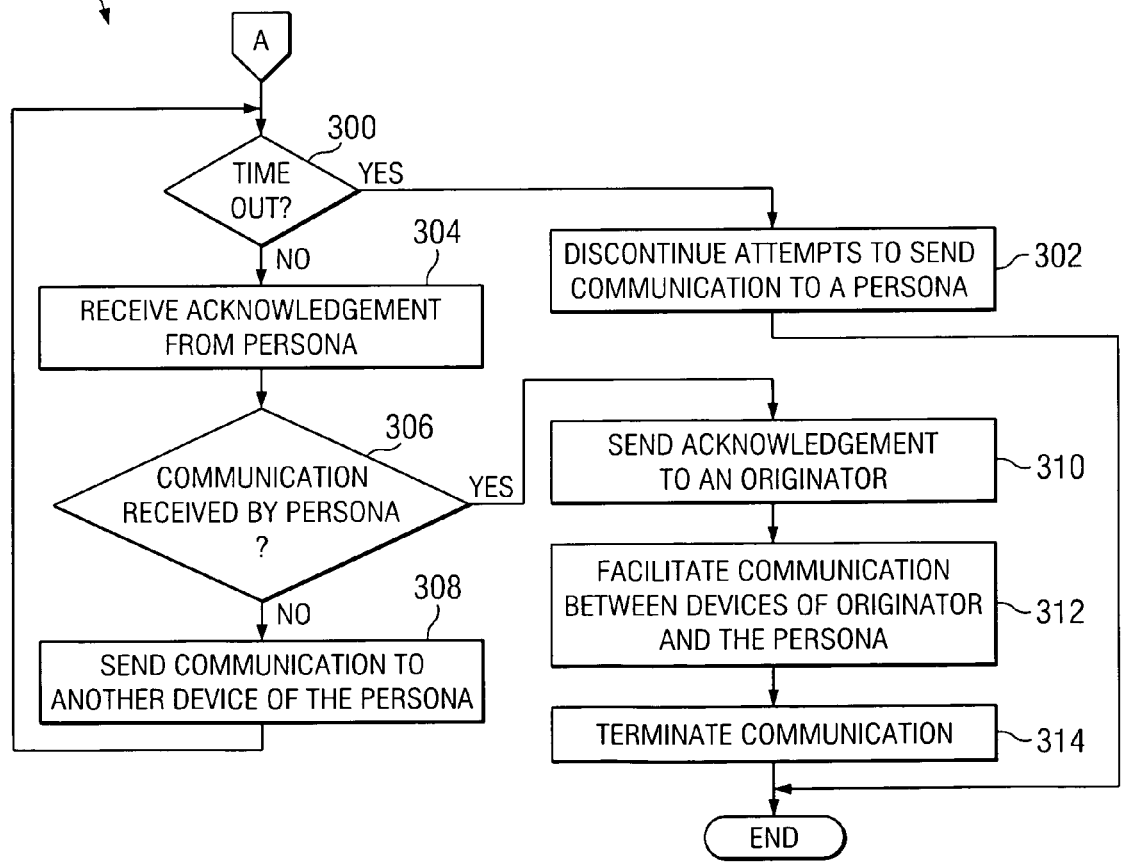

SYSTEM AND METHOD FOR PROVIDING INTERACTIVE COMMUNICATIONS

TECHNICAL FIELD OF THE INVENTION

This invention relates generally to the field of communications and more specifically to a system and a method for providing interactive communications.

BACKGROUND

When a party attempts to communicate with another party, a decision is made by the party originating the communication regarding how to initiate communication with the targeted party. For example, if the targeted party receiving the communication has an email address, an instant message account, and a telephone, the originating party must determine which method to use to contact the targeted party. According to one technique, the originating party randomly decides how to contact the targeted party. Because of the random nature of the decision, the targeted party may not receive the communication and the originating party is not educated about the best method to use to contact the targeted party.

SUMMARY OF THE DISCLOSURE

From the foregoing, it may be appreciated by those skilled in the art that a need has arisen for an ability to optimally contact a party. In accordance with the present invention, a system and method for providing interactive communications are provided that substantially eliminate or greatly reduce disadvantages and problems associated with previously developed systems and methods.

According to one embodiment of the present invention, interactive communications include receiving a communication from an originator destined for a targeted persona. An identity of the targeted persona is determined and one or more rules associated with the identity of the targeted persona is determined. Presence information of the targeted persona is obtained. The communication is sent to the targeted persona in accordance with the determination of the identity of the targeted persona, the one or more rules associated with the identity, and the presence information of the targeted persona.

In another embodiment, interactive communications includes receiving a first communication from a first persona to contact a second persona and sending the first communication to the second persona. A second communication from the second persona is received to respond to the first persona and the second communication is sent to the first persona. Sending the first and second communications includes determining an identity of a particular persona of the first and second personas, determining one or more rules associated with the identity of the particular persona, obtaining presence information of the particular persona, and sending the communication to the particular persona in accordance with the determination of the identity of the particular persona, the one or more rules associated with the identity, and the presence information of the particular persona. Communication is facilitated between the first persona and the second persona.

Certain embodiments of the invention may provide one or more technical advantages. A technical advantage of one embodiment includes intelligently determining how to contact a persona. A systematic approach is provided that eliminates any guessing when determining how to contact a persona and provides for logical decision-making based on the available information about the persona. Reliable delivery of a communication is provided from one persona to another. Another technical advantage of an embodiment includes providing feedback to the originator of the communication. For example, the feedback may include how to reach the targeted persona, the location of the targeted persona, or whether the targeted persona receives the communication.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like numerals being used for like and corresponding parts of the various drawings, in which:

FIG. 2 is a flowchart illustrating one embodiment for sending a communication to a targeted persona;

FIG. 3 is a flowchart illustrating one embodiment for receiving an acknowledgement from the targeted persona.

DETAILED DESCRIPTION OF THE DRAWINGS

Figure 1:
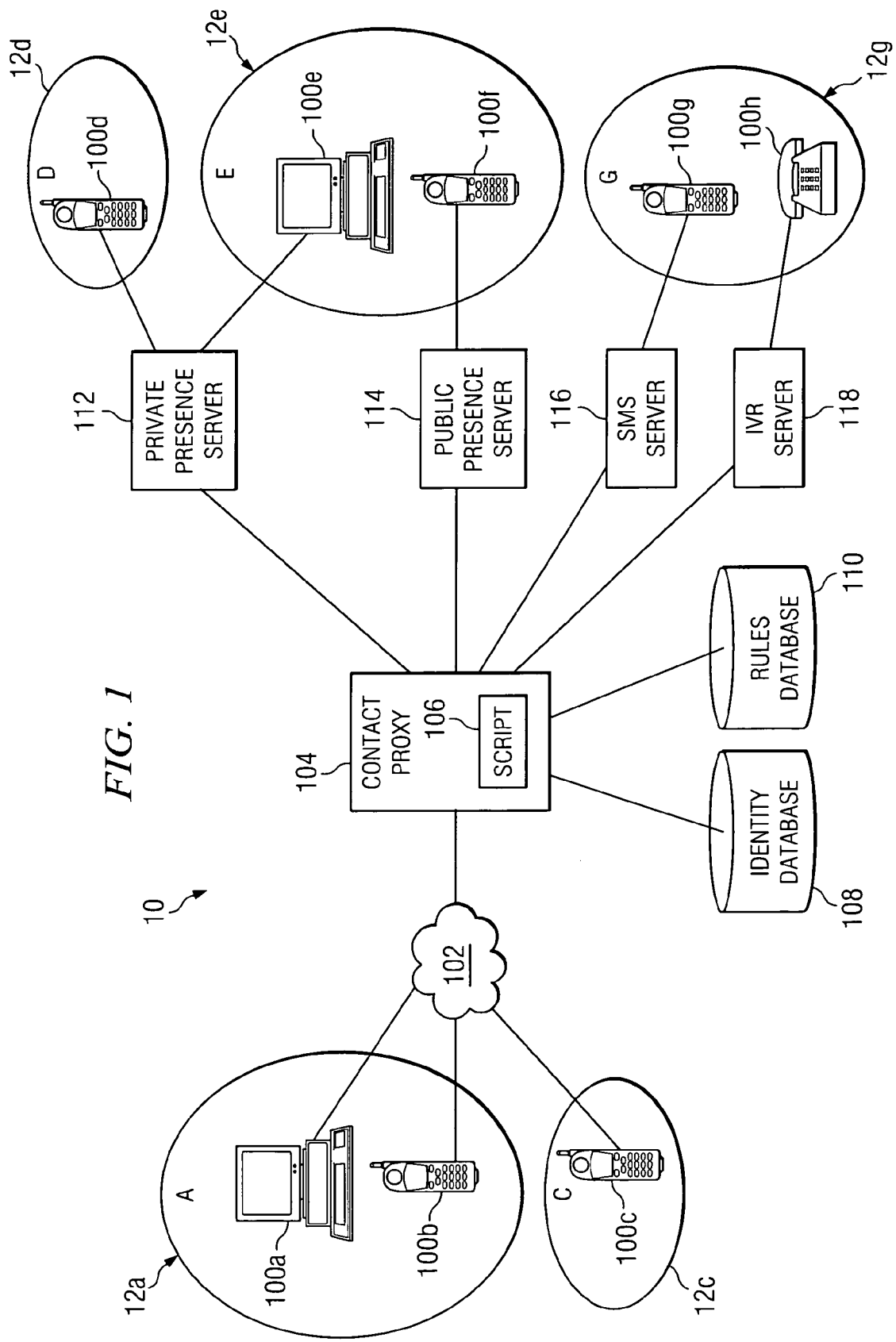
FIG. 1 is a system illustrating one embodiment of an interactive communications system.

FIG. 1 illustrates one embodiment of an interactive communication system. The communication devices interact with a contact proxy, which determines information about other communication devices to intelligently decide how to contact those communication devices.

According to the illustrated embodiment, system 10 includes a number of communication devices 100 that communicate with each other through communication network 102. For example, communication devices 100 send and receive data signals, audio signals, video signals, or any combination of the preceding. The signals may communicate information, such as data, audio, video, multimedia, any suitable type of information, or any combination of the preceding. The communication may be in the form of a phone call, an e-mail, an instant message, a text message, a page, or any suitable form of communication. Communication devices 100a-h may include, for example, a telephone, an Internet Protocol (IP) telephone, a cellular phone, a paging communication device, a Personal Digital Assistant (PDA), a computer supporting a telephony application, or any other communication device suitable for communicating information. Communication devices 100a-h may support, for example, Internet Protocol, Session Initiation Protocol, or any other suitable communication protocol.

Communication network 102 allows communication devices 100a-h to communicate with other networks or communication devices 100. Communication network 102 may include a public or private data network; a local, regional, or global communication network; an enterprise intranet; any other suitable network arrangement; or any combination of the preceding. Communication network 102 may include any combination of gateways, routers, hubs, switches, and any other hardware, software, or a combination of the preceding that may implement any suitable communication protocol.

Communication devices 100a-100h are each associated with a persona 12. An originating persona 12 initiates a communication from an associated communication device 100. A targeted persona 12 is the end user that an originating persona 12 through a communication device 100 attempts to contact. Persona 12 may have one or more communication devices 100 associated with it. For example, communication devices 100a and 100b are associated with persona 12a; communication device 100c is associated with persona 12c; communication device 100d is associated with persona 12d; communication devices 100e and 100f are associated with persona 12e; and communication devices 100g and 100h are associated with persona 12g. When a targeted persona 12 has more than one communication device 100 associated with it, originating persona 12 has the option of contacting more than one communication device 100 to reach targeted persona 12. Contact proxy 104 assists originating persona 12 in intelligently contacting targeted persona 12.

Contact proxy 104 intelligently determines how originating persona 12 will contact targeted persona 12. Contact proxy 104 may be any suitable element operable to intercept the communication and make a logical decision regarding the communication's destination. Contact proxy 104 considers the identity of targeted persona 12, one or more rules associated with the identity of targeted persona 12, and the presence of targeted persona 12 to determine how to contact targeted persona 12. Upon gathering the identity, the rules, and the presence information of targeted persona 12, contact proxy 104 generates a script 106 for sending the communication. Script 106 reflects the steps that contact proxy 104 follows in attempting to contact targeted persona 12 on behalf of originating persona 12. For example, script 106 may instruct contact proxy 104 to contact targeted persona 12 at a particular communication device 100 because of the time of the communication. As another example, contact proxy 104 may determine the presence of targeted persona 12 and script 106 instructs contact proxy 104 to contact targeted persona 12 at more than one communication device 100 based on the presence of targeted persona 12.

Identity database 108 includes identity information of each persona 12. The identity information denotes the particular persona 12. Identity database 108 may include identity information of personas 12 outside of communication network 102 in addition to personas 12 within communication network 102. Identity database 108 may include any appropriate information to identify persona 12 and is organized in a way to facilitate retrieval.

Rules database 110 includes rules associated with the identity of each persona 12. The rules may indicate contact information of persona 12, such as what communication device 100 to send the communication, when to send the communication to a particular communication device 100, or any suitable rule associated with the identity of each persona 12. The rules may differ based on communication device 100, persona 12, or any suitable basis. Based on the rules in rules database 110, along with identity and presence information, script 106 is generated. Script 106 may be generated by rules database 110, contact proxy 104, or any suitable element.

Private Presence Server 112 and Public Presence Server 114 process information to detect whether persona 12 is online, whether persona 12 is available, or any other suitable information regarding the presence of persona 12. Private Presence Server 112 detects personas 12 within a private network, while Public Presence Server 114 detects personas 12 outside a private network. System 10 may include any presence server or combination of presence servers to determine the presence information of persona 12. The presence information may be provided explicitly or implicitly. Private Presence Server 112 may use any suitable protocol to detect presence information and send communication to communication device 100. For example, Private Presence Server 112 may use Extensible Messaging and Presence Protocol (XMPP), Session Initiation Protocol for Instant Messaging and Presence Leveraging Extensions (SIMPLE), or any web services. Public Presence Server 114 may use any suitable protocol to detect presence information to communicate with communication device 100. Such protocols may include Jabber, ICQ, Open System for Communication in Realtime (OSCAR), or any suitable protocol.

Short Message Service Server 116 (SMS Server 116) facilitates short text message sending to communication devices 100. SMS Server 116 may send communications to communication devices 100 using any suitable private or web-based protocol.

Interactive Voice Response Server 118 (IVR Server 118) allows interaction between communication devices 100 and a database to acquire information or enter information into the database. IVR Server 118 may facilitate communication devices 100 in retrieving a communication or receiving a communication.

In operation, an originating communication device 100 associated with an originating persona 12 attempts to contact a targeted persona 12 by sending a communication. The communication may include the identity of targeted persona 12, the urgency of the communication, the lifetime of the communication, or any suitable information to use in transmitting the communication. Contact proxy 104 intercepts the communication and determines how to effectively transmit the communication to targeted persona 12. Using the identity information found in identity database 108, the rules in rules database 110, and the presence information from a presence server 112 or 114, contact proxy 104 generates a script 106 that reflects the best way to contact targeted persona 12 based on the gathered information. For example, script 106 may direct contact proxy 104 to transmit the communication to communication device 100e of targeted persona 12e because targeted persona 12e is currently online. As another example, contact proxy 104 may determine that targeted persona 12e is not online but is available through communication device 10 of and presently able to accept communications. In this example, contact proxy 104 sends the communication to communication device 100f of targeted persona 12e. By gathering the information and developing script 106 to transmit the information, originating communication device 100a associated with originating persona 12a establishes contact with targeted persona 12e.

While contact proxy 104 attempts to contact targeted persona 12e, contact proxy 104 may send originating persona 12a a status message to update originating persona 12a on the progress of the communication. When the communication is transmitted to targeted persona 12e, an acknowledgment of the transmission may be sent back to originating persona 12a. The same steps of determining the identity information, the rules associated with the identity, and the presence of originating persona 12a are used in sending the acknowledgement. Thus, for the acknowledgment, originating persona 12a becomes a targeted persona 12a. For example, originating persona 12a may not be at the same communication device 100 from which the communication was originally sent. Therefore, the acknowledgement may be sent to a different communication device 100 associated with originating persona 12a upon determining the appropriate script 106. The acknowledgement may be an explicit acknowledgement or an implicit acknowledgement. Originating persona 12a may respond accordingly based on the acknowledgment. For example, if the acknowledgement informs originating persona 12a that targeted persona 12e is available at another communication device 100, contact proxy 104 may contact that communication device 100 of targeted persona 12e on behalf of originating persona 12a.

Modifications, additions, or omissions may be made to the system without departing from the scope of the invention. Moreover, the operations of system 10 may be performed by more, fewer, or other modules. The components of system 10 may be integrated or separated according to particular needs. For example, identity database 108 and rules database 110 may be included within contact proxy 104. As another example, contact proxy 104, identity database 108, rules database 110, Private Presence Server 112, Public Presence Server 114, SMS Server 116, and IVR Server 118 may be included within communication network 102. Additionally, the operations of system 10 may be performed using any suitable logic comprising software, hardware, other logic, or any suitable combination of the preceding. The logic may be embodied on a computer readable medium. As used in this document, "each" refers to each member of a set or each member of a subset of a set.

FIG. 2 is a flowchart 20 illustrating one embodiment for sending a communication to a targeted persona 12e. At step 200, contact proxy 104 receives a communication from originating persona 12a to contact a targeted persona 12e. The identity of targeted persona 12e is determined at step 202 and the rules associated with the identity of targeted persona 12e are determined at step 204. An identity database 108 may contain the identity information of each persona 12. A rules database 110 may contain the rules associated with the identity information of each persona 12. Contact proxy 104 obtains the presence information of targeted persona 12e at step 206 from any of various presence servers 112 and 114. A script 106 is generated at step 208 that directs how the communication is transmitted to targeted persona 12e. The generated script 106 is based on the identity, the rules, and the presence information of targeted persona 12e. The communication is sent to targeted persona 12e at step 210 following script 106 generated at step 208. At decisional step 212, it is determined whether contact proxy 104 is still trying to contact targeted persona 12e. If contact proxy 104 has contacted targeted persona 12e, the method continues to point A. However, if contact proxy 104 has not contacted targeted persona 12e but is still trying, contact proxy 104 may send a status message to originating persona 12a at step 214. A status message informs originating persona 12a of the status of the communication. For example, the status message may inform originating persona 12a that contact proxy 104 is still attempting to contact targeted persona 12e.

The method described is only an example of sending a communication to a persona. Modifications, additions, or omissions may be made to the method without departing from the scope of the invention. The method may include more, fewer, or other steps. Additionally, steps may be performed in any suitable order without departing from the scope of the invention.

FIG. 3 is a flowchart 30 illustrating one embodiment for receiving an acknowledgement from a targeted persona 12. Continuing from point A as shown in FIG. 2, it is determined at decisional step 300 whether a time out occurs. If a time out did occur, contact proxy 104 discontinues its attempt to send the communication to targeted persona 12e and the method ends. However, if a time out did not occur, contact proxy 104 receives an acknowledgement from targeted persona 12e at step 304 regarding the communication. The acknowledgement may inform originating persona 12a that targeted persona 12e received the communication, that targeted persona 12e will be available at a different time, or any suitable acknowledgement that informs originating persona 12a of the communication. At decisional step 306, it is determined whether targeted persona 12e received the communication. If targeted persona 12e did not receive the communication, a presence status for targeted persona 12e will be continuously monitored and the attempt may be retried by sending the communication to another communication device 100 of targeted persona 12e at step 308. The method continues from step 300 upon sending the communication to another communication device 100 of targeted persona 12e.

If targeted persona 12e receives the communication, an acknowledgement is sent to originating persona 12a at step 310 regarding the communication. To send the acknowledgement to originating persona 12a, contact proxy 104 determines the identity of originating persona 12a, the rules associated with the identity of originating persona 12a, and the presence of originating persona 12a. Contact proxy 104 generates a script 106 based on the determined information and follows script 106 to send the acknowledgement to originating persona 12a. Upon receiving the acknowledgment, direct or indirect communications may be established between communication devices 100a and 100e, or other appropriate communication devices 100, of originating persona 12a and targeted persona 12e at step 312. Contact proxy 104 may facilitate the direct or indirect communications between the communication devices 100a and 100e of originating persona 12a and targeted persona 12e. When communications are terminated at step 314, the method subsequently ends.

The method described is only an example of receiving an acknowledgement from a targeted persona. Modifications, additions, or omissions may be made to the methods without departing from the scope of the invention. The method may include more, fewer, or other steps. Additionally, steps may be performed in any suitable order without departing from the scope of the invention.

A specific example of operation includes an originating persona 12a sending an "epage" to a targeted persona 12e. An "epage" allows originating persona 12a to contact targeted persona 12e by calling a specific "epage" number or sending an e-mail to a specific "epage" email address. The "epage" is routed within an enterprise network to contact proxy 104. Contact proxy 104 contacts private presence server 112 to determine whether targeted persona 12e is reachable. If targeted persona 12e is reachable and by an instant message (IN), the "epage" will be transformed into an IM and routed to targeted persona 12e by contact proxy 104. If the IM is acknowledged by targeted persona 12a, the response will be routed to originating persona 12a according to the procedures discussed above. If the IM is not acknowledged, the original "epage" will be re-routed for additional processing by contact proxy 104. When the response to the IM is routed to originating persona 12a, contact proxy 104 may determine how to route the information based on the presence status of originating persona 12a.

Another specific example of operation includes an originating persona 12a attempting to reach a targeted persona 12e within a certain time period. The originating persona 12a sends an IM to contact proxy 104 indicating that the IM needs to be acknowledged within a specific time period. The acknowledgement may indicate whether the IM was delivered to the targeted persona 12e or not. Following script 106 generated from identity database 108 and rules database 110, contact proxy 104 first attempts to contact the targeted persona 12e by IM. If this fails, contact proxy 104 attempts to contact targeted persona 12e by cellular phone. If targeted persona 12e is not accessible by cellular phone, contact proxy 104 sends an e-mail to targeted persona 12e. After the time period has elapsed, originating persona 12a receives an acknowledgement that targeted persona 12e could not be contacted. As another option, contact proxy 104 may send originating persona 12a a status message before the time period ends noting that targeted persona 12e has not been contacted. If targeted persona 12e receives and reads the e-mail before the time period elapses, contact proxy 104 forwards an acknowledgement to originating persona 12a, which may be forwarded based on the presence status of originating persona 12a.

In summary, contact proxy 104 provides an ability to intelligently determine how to contact a targeted persona 12. A systematic approach is provided that eliminates any guessing when determining how to contact a targeted persona 12 and provides for logical decision-making based on the available information about the targeted persona 12. Reliable delivery of a communication is provided from an originating persona 12a to a targeted persona 12e. Feedback to the originating persona 12a of the communication is also provided by contact proxy 104. For example, the feedback may include how to reach the targeted persona 12e, the location of the targeted persona 12e, or whether the targeted persona 12e receives the communication. In addition, contact proxy 104 may also take into account cost savings when determining a delivery method for the communication. In this manner, contact proxy 104 can provide the communication to the targeted persona 12e in the most efficient communications medium available without requiring that the originating persona 12a know the different communication devices available to a targeted persona 12e and the availability of the targeted persona 12e on the different devices.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method for providing interactive communications, comprising:
    receiving a communication from a first of a plurality of communication devices associated with an originating persona, the communication destined for a targeted persona;
    determining an identity of the targeted persona;
    determining one or more rules associated with the identity of the targeted persona;
    obtaining presence information of the targeted persona;
    generating a script for sending the communication based on the identity of the targeted persona, the one or more rules associated with the identity of the targeted persona, and the presence information of the targeted persona, wherein the script indicates steps to follow for sending the communication to the targeted persona;
    sending the communication to a first communication device associated with the targeted persona in accordance with the determination of the identity of the targeted persona, the one or more rules associated with the identity, and the presence information of the targeted persona;
    sending, to the originating persona, a communication status that indicates a status of the communication sent to the first communication device associated with the targeted persona, wherein the communication status is sent after receiving the communication from the first of the plurality of communication devices associated with the originating persona and before the communication is received by the first communication device associated with the targeted persona;
    determining whether the communication is received by the first communication device associated with the targeted persona;
    sending the communication to a second communication device associated with the targeted persona if the first communication device associated with the targeted persona does not receive the communication;
    sending an acknowledgement of the communication to the first of the plurality of communication devices associated with the originating persona if the communication is received by the targeted persona;
    determining whether the acknowledgement is received by the first of the plurality of communication devices associated with the originating persona;
    sending the acknowledgement of the communication, based on one or more rules associated with an identity of the originating persona, to a second of the plurality of communication devices associated with the originating persona if the first of the plurality of communication devices associated with the originating persona does not receive the acknowledgement, wherein sending the acknowledgement comprises:
        determining the identity of the originating persona;
            determining the one or more rules associated with the identity of the originating persona;
        obtaining presence information of the originating persona;
            sending the acknowledgement to a selected one of the first and the second of the plurality of communication devices associated with the originating persona based on the identity of the originating persona, the one or more rules associated with the identity, and the presence information of the originating persona.

2. The method of claim 1, wherein the communication includes an identity of the persona, an urgency of the communication, and a lifetime of the communication.

3. The method of claim 1, further comprising facilitating communication between the originator and the persona in accordance with the determination of whether the communication is received by the persona.

4. The method of claim 1, wherein the one or more rules associated with the identity of the persona vary depending on at least the persona and one or more communication devices of the persona.

5. The method of claim 1, wherein determining the one or more rules associated with the identity of the persona includes determining one or more communication devices associated with the persona.

6. The method of claim 1, wherein the communication is sent to a first one of a plurality of communication devices associated with the persona.

7. The method of claim 6, further comprising:
    determining whether the communication is received at the first one of the plurality of communication devices associated with the persona;
    sending the communication to a second one of the plurality of communication devices in accordance with the determination of whether the communication is received by the first one of the plurality of communication devices.

8. A system for providing interactive communications, comprising:

a plurality of communication devices operable to facilitate communication between a plurality of personas, each persona associated with at least one of the plurality of communication devices;

an identity database operable to store identity information of the plurality of personas;

a rules database operable to store rules associated with the identity information of the plurality of personas;

one or more presence servers operable to manage presence information of the plurality of personas;

a contact proxy coupled to the identity database, the rules database, and the one or more presence servers operable to receive a communication from a first of a plurality of communication devices associated with an originating persona, the communication destined for a particular targeted persona of the plurality of personas, the contact proxy further operable to determine an identity of the particular targeted persona, the contact proxy further operable to determine one or more rules associated with the identity of the particular targeted persona, the contact proxy further operable to obtain presence information of the particular targeted persona, the contact proxy further operable to generate a script, wherein the script is operable to indicate steps for sending the communication to the particular targeted persona, the contact proxy further operable to send a communication to a first communication device associated with the particular targeted persona in accordance with the determination of the identity information of the particular targeted persona, the one or more rules associated with the identity information, and the presence information of the particular targeted persona, the contact proxy further operable to:

send, to the originating persona, a communication status that indicates a status of the communication sent to the first communication device associated with the targeted persona, wherein the communications status is sent after receiving the communication from the first of the plurality of communication devices associated with the originating persona and after sending the communication to the first communication device associated with the targeted persona;

determine whether the communication is received by the first communication device associated with the particular targeted persona;

send the communication to a second communication device associated with the targeted persona if the first communication device associated with the targeted persona does not receive the communication;

send an acknowledgement of the communication to the first of the plurality of communication devices associated with the originating persona if the communication is received by the targeted persona;

determine whether the acknowledgement is received by the first of the plurality of communication devices associated with the originating persona;

send the acknowledgement of the communication, based on one or more rules associated with an identity of the originating persona, to a second of the plurality of communication devices associated with the originating persona if the first of the plurality of communication devices associated with the originating persona does not receive the acknowledgement, wherein sending the acknowledgement comprises:

determining the identity of the originating persona;

determining the one or more rules associated with the identity of the originating persona;

obtaining presence information of the originating persona;

sending the acknowledgement to a selected one of the first and the second of the plurality of communication devices associated with the originating persona based on the identity of the originating persona, the one or more rules associated with the identity, and the presence information of the originating persona.

9. The system of claim 8, wherein the communication includes an identity of the particular persona, an urgency of the communication, and a lifetime of the communication.

10. The system of claim 8, wherein the contact proxy is further operable to determine whether the communication is received by the particular persona.

11. The system of claim 10, wherein the contact proxy is further operable to send an acknowledgement to the originator of the communication in accordance with the determination of whether the communication is received by the persona.

12. The system of claim 10, wherein the contact proxy is further operable to facilitate communication between the originator and the particular persona in accordance with the determination of whether the communication is received by the persona.

13. The system of claim 8, wherein the contact proxy is operable to send the communication to one or more communication devices of the particular persona.

14. A system for providing interactive paging, comprising:
a computer operable to execute logic;
a non-transitory computer readable medium including logic, the logic operable, when executed, to:
receive a communication from a first of a plurality of communication devices associated with an originating persona, the communication destined for a targeted persona;
determine an identity of the targeted persona;
determine one or more rules associated with the identity of the targeted persona;
obtain presence information of the targeted persona;
generate a script for sending the communication based on the identity of the targeted persona, the one or more rules associated with the identity of the targeted persona, and the presence information of the targeted persona, wherein the script indicates steps to follow for sending the communication to the targeted persona;
send the communication to a first communication device associated with the targeted persona in accordance with the determination of the identity of the targeted persona, the one or more rules associated with the identity, and the presence information of the targeted persona;
send, to the originating persona, a communication status that indicates a status of sending the communication sent to the first communication device associated with the targeted persona, wherein the communication status is sent after receiving the communication from the first of the plurality of communication devices associated with the originating persona and before the communication is received by the first communication device associated with the targeted persona;
determine whether the communication is received by the first communication device associated with the targeted persona;

send the communication to a second communication device associated with the targeted persona if the first communication device associated with the targeted persona does not receive the communication;

send an acknowledgement of the communication to the first of the plurality of communication devices associated with the originating persona if the communication is received by the targeted persona;

determine whether the acknowledgement is received by the first of the plurality of communication devices associated with the originating persona;

send the acknowledgement of the communication, based on one or more rules associated with an identity of the originating persona, to a second of the plurality of communication devices associated with the originating persona if the first of the plurality of communication devices associated with the originating persona does not receive the acknowledgement, wherein sending the acknowledgement comprises:

determining the identity of the originating persona;
determining the one or more rules associated with the identity of the originating persona;
obtaining presence information of the originating persona;
sending the acknowledgement to a selected one of the first and the second of the plurality of communication devices associated with the originating persona based on the identity of the originating persona, the one or more rules associated with the identity, and the presence information of the originating persona.

15. The system of claim 14, wherein the logic is operable to determine whether the communication is received by the persona.

16. The system of claim 15, wherein the logic is operable to send an acknowledgement to the originator of the communication in accordance with the determination of whether the communication is received by the persona.

17. The system of claim 15, wherein the logic is operable to facilitate communication between the originator and the persona in accordance with the determination of whether the communication is received by the persona.

18. The system of claim 14, wherein the communication is sent to a first one of a plurality of communication devices associated with the persona.

19. The system of claim 18, wherein the logic is operable to:
determine whether the communication is received at the first one of the plurality of communication devices associated with the persona;
send the communication to a second one of the plurality of communication devices in accordance with the determination of whether the communication is received by the first one of the plurality of communication devices.

20. A method for providing interactive communications, comprising:
intercepting a first type of communication from a first of a plurality of communication devices associated with an originating persona, the communication destined for a targeted persona;
determining an identity of the targeted persona;
determining one or more rules associated with the identity of the targeted persona;
obtaining presence information of the targeted persona;
generating a script based on the identity of the targeted persona, the one or more rules associated with the identity of the targeted persona, and the presence information of the targeted persona, wherein the script indicates steps to follow for sending the communication to the targeted persona;

sending a second type of communication to a first communication device associated with the targeted persona based on the script;

sending, to the originating persona, a communication status that indicates a status of the second type of communication sent to the first communication device associated with the targeted persona, wherein the communication status is sent after receiving the communication from the first of the plurality of communication devices associated with the originating persona and before the second type of communication is received by the first communication device associated with the targeted persona;

determining whether the second type of communication is received by the first communication device associated with the targeted persona;

sending the second type of communication to a second communication device associated with the targeted persona if the first communication device associated with the targeted persona does not receive the second type of communication;

sending an acknowledgement of the communication to the first of the plurality of communication devices associated with the originating persona if the communication is received by the targeted persona;

determining whether the acknowledgement is received by the first of the plurality of communication devices associated with the originating persona;

sending the acknowledgement of the second type of communication, based on one or more rules associated with an identity of the originating persona, to a second of the plurality of communication devices associated with the originating persona if the first of the plurality of communication devices associated with the originating persona does not receive the acknowledgement, wherein sending the acknowledgement comprises:
determining the identity of the originating persona;
determining the one or more rules associated with the identity of the originating persona;
obtaining presence information of the originating persona;
sending the acknowledgement to a selected one of the first and the second of the plurality of communication devices associated with the originating persona based on the identity of the originating persona, the one or more rules associated with the identity, and the presence information of the originating persona.

21. The method of claim 20 further comprising sending a third type of communication to one of a plurality of communication devices based on the script.

22. The method of claim 20 further comprising transforming the first type of the communication to a second type of the communication.

23. The method of claim 20 further comprising sending the second type of communication to a second communication device associated with the targeted persona if the second type of communication is not received by a first communication device associated with the targeted persona after a predetermined time limit.

* * * * *